United States Patent [19]

Ervin et al.

[11] 4,261,667

[45] Apr. 14, 1981

[54] COVE JOINTS, FURNITURE THEREFROM, AND FURNITURE MANUFACTURING METHOD

[75] Inventors: Evander M. Ervin; Ervin E. Dargan, both of Box 826, Florence, S.C. 29501; Richard Ferguson, Charlotte, N.C.

[73] Assignees: Evander M. Ervin; Ervin E. Dargan, both of Florence, S.C.

[21] Appl. No.: 946,431

[22] Filed: Sep. 27, 1978

[51] Int. Cl.³ ................. B25G 3/00; F16B 9/02; F16L 41/00
[52] U.S. Cl. ................. 403/258; 403/231; 403/167; 403/237
[58] Field of Search ........... 403/16, 231, 233, 234, 403/237, 296, 217, 258, 260; 85/42

[56] References Cited

U.S. PATENT DOCUMENTS 4,008,971  2/1977  Wah et al. .................. 403/237

FOREIGN PATENT DOCUMENTS 384769  12/1932  United Kingdom ............ 403/234
1229110  4/1971  United Kingdom ............ 85/42

*Primary Examiner*—Wayne L. Shedd
*Attorney, Agent, or Firm*—Richards, Shefte & Pinckney

[57] ABSTRACT

Furniture disclosed herein is substantially constructed of elongated cylindrical wooden members which are connected together by cove joints including a first such member coved at an end thereof to fit conformingly against the curved surface of a second such member at an angle thereto, a hanger bolt secured in and extending from the coved end of the first member substantially through a transverse bore in the second member, and a drive-socketed flanged cap nut engaging the extending end of the bolt and bearing against the opposite curved surface of the second cylindrical member to adjustably compress the cylindrical members together at their conforming fit to stabilize the joint. The flanged nut has a cylindrical portion containing its threads for entry into the bore for centering it under the nut flange, and the flange has an annular appearance skirt extending toward the curved surface of the second wooden member for cutting thereinto and hiding the undersurface of the flange. A furniture manufacturing method in which pluralities of standardized cylindrical members and bolts are prepared complete ready for further assembly to form cove joints, suitably selected members including the bolts are assembled with cove joints to form a particular piece of furniture, and the cap nuts are attached to the bolts and screwed down to compress the members together at the joints to the degree needed to stabilize the joints.

15 Claims, 9 Drawing Figures

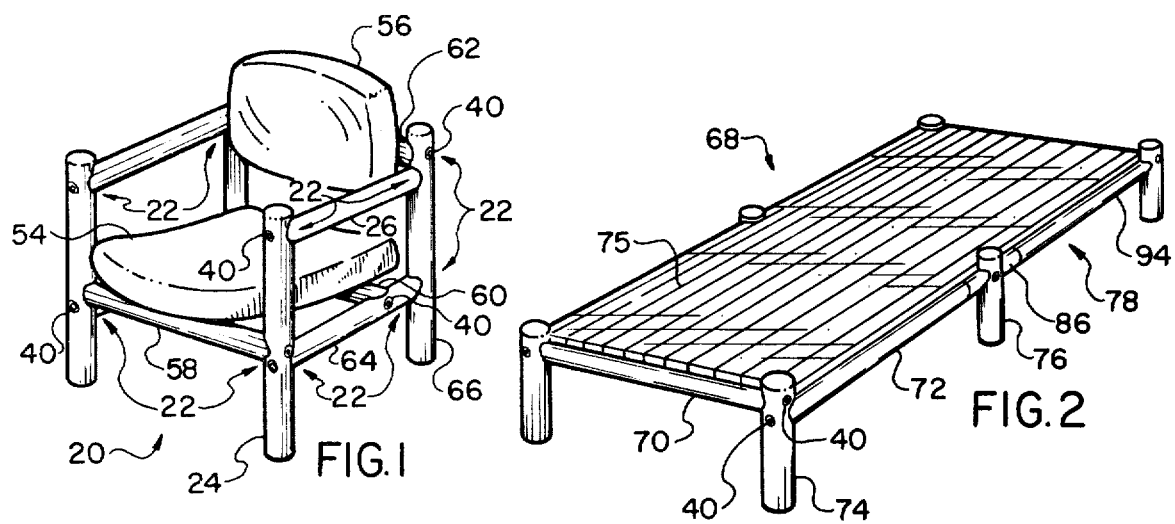
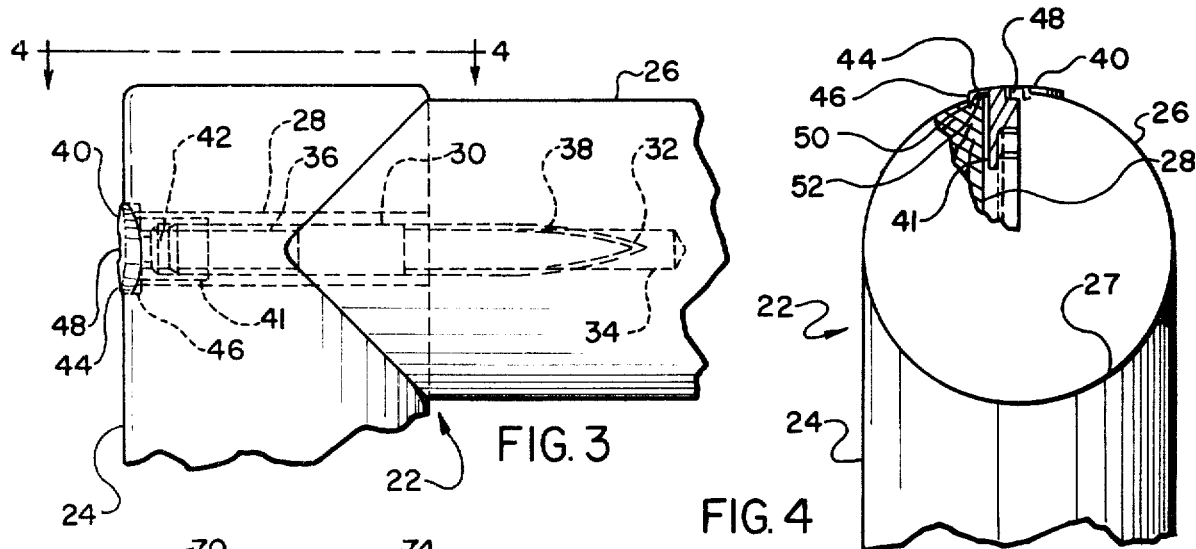
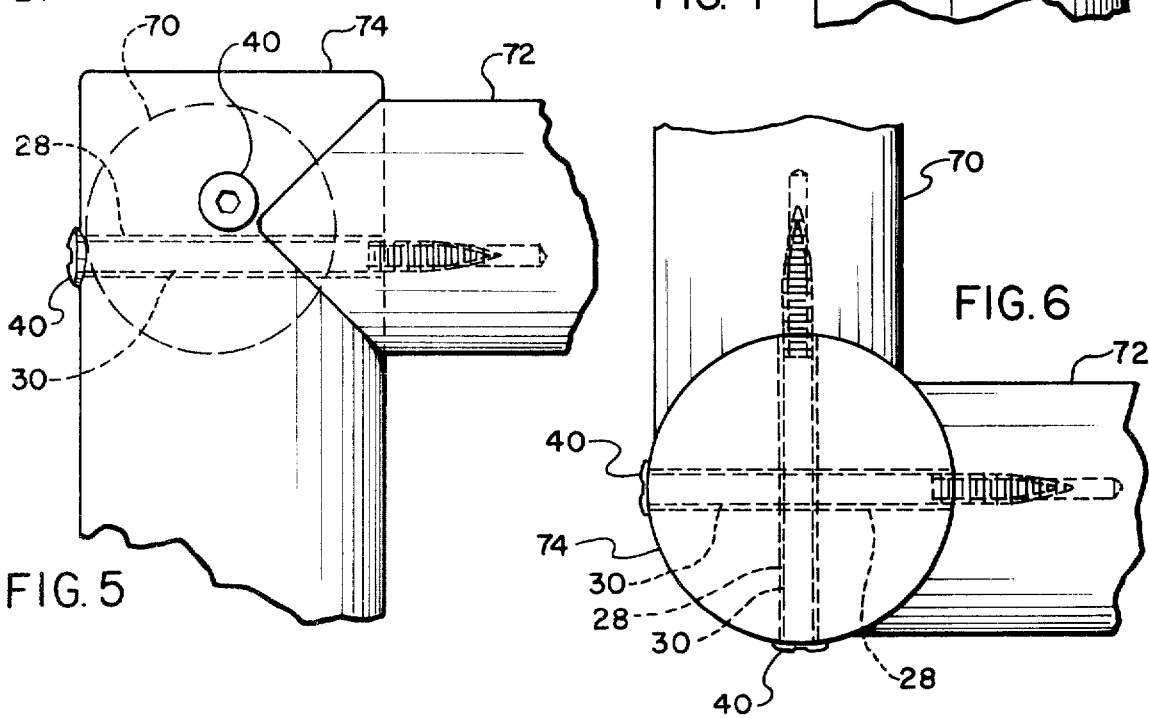

COVE JOINTS, FURNITURE THEREFROM, AND FURNITURE MANUFACTURING METHOD

BACKGROUND OF THE INVENTION

Cove joints have been used in various furniture and other joints, particularly in rattan, wicker, and bamboo furniture types or simulations thereof, where the joints are wrapped with cord, wicker or rattan strips, tape or similar material for appearance and to retain the joint members, and a wooden dowel is sometimes inserted and glued into a hole in the coved end of one joint member extending therefrom to be glued into a mating hole in the other joint member to add strength to the joint.

Other cove joints have been used in knock-down furniture and either riveted together or held in engagement by folding linkages or pintles and gudgeons external to the joints.

Still other cove joints found in log cabin construction, tool handles, green-house construction, and other diverse uses, are held together by various means, including eyebolts, split sleeves, and gravity, but none have the particular features of the present invention.

While the prior art has used elements of the present invention individually and in certain subcombinations, it nowhere discloses or suggests the particular novel combinations claimed in the present invention which form the basis for handsome knock-down furniture which does not have the usual junky knock-down lock and which can be store- or home-assembled from standardized components into exceptionally sturdy pieces which have a simple, graceful design of great contemporary appeal. The structural joints of this furniture appear almost seamless, have immense strength, can be tightened as necessary if hard use, old age, or weathering ever loosens them, and can be readily disassembled for space-saving storage or shipment if desired. The elongated cylindrical wooden structural components of this furniture are planned to be made from Roundwood ® dowels on a special purpose machine fed cut-to-length dowels and producing finished components complete with hanger bolts installed, so that the basic structure of a piece of furniture can be assembled from such components and a supply of suitable cap nuts. Roundwood ® dowels are themselves produced on a patented machine by a process which assures the most efficient utilization of raw logs with a minimum of sawdut waste by extracting the rounds directly from the logs, after which the green rounds may be kiln dried and machined to true roundness and smooth surface finish more expeditiously than by the more conventional processes of sawing squares from logs, drying the squares, and then producing rounds from the squares, so that the production of this type furniture should be highly material-, energy-, and labor-efficient.

SUMMARY OF THE INVENTION

The present invention provides a furniture joint including a first generally cylindrical wooden member, a second generally cylindrical wooden member coved at an end thereof to fit comformingly against the cylindrically curved surface of the first member at an angle thereto, tensile means for engaging with and extending between the first and second members and at least substantially through the first member for compressing the members together where conformingly fit against each other, and the tensile means includes means for setting the degree of compressing for sufficiently heavy engagement of the members in the joint to create sufficient compressing for stabilizing the joint.

Briefly described, the joint is further characterized by a transverse bore extending through the first member for reception therein of the tensile means, and the tensile means engages the first member adjacent the bore. The tensile means comprises threaded means having at one end threads suitable for engaging with the second member and at the other end driving means and a flange having an undersurface suitable for engaging with the first member in opposing relation to the conforming fit of the second member against the first member.

Preferably, the tensile means of the present invention is comprised of a stud substantially smaller than the bore and threaded at both ends, at one end with the aforementioned threads for engaging the second member, and at the other end with straight threads, and a nut having a cylindrical portion substantially larger in diameter than the stud and having internal threads for engagement with the straight threads, means for driving the nut, and an external flange on the nut having an undersurface for engaging with the first member at the cylindrical surface thereof opposite from, and in opposing relation to, the conforming fit of the second member against the first member, the straight threads and the nut comprising the aforementioned setting means. The first member preferably has a transverse bore therethrough only slightly larger than the cylindrical portion of the nut, at the same angle as that between the first and second members, for extension of the tensile member therethrough.

In the preferred embodiment of the invention, the nut flange has an appearance skirt of annular or hollow generally cylindrical shape at the periphery thereof, and suitably larger than the transverse bore, having a sharp lip extending toward the stud threads engaging the second member sufficiently for essentially complete circumferential contact of the skirt with the first member upon such stabilizing for hiding the undersurface of the flange. The cylindrical portion of the nut enters the bore first, thereby centering the outer end of the bore under the nut flange and skirt for covering thereby prior to engagement of the skirt and flange with the first wooden member, the sharp lip cutting into the first wooden member upon such engagement. The flange is of sufficient thickness such that upon such compressing and stabilizing of the joint, the outer surface of the nut flange opposite the undersurface thereof remains at its periphery slightly above flush with relation to the engaged cylindrical surface of the first wooden member at its closest approach thereto. It is preferred to embody these joints in furniture having structural members and load-bearing joints between the members, in which substantially all of the structural members are made of wood of elongated generally cylindrical shape, and the joints of the present invention are used at substantially all of the load bearing joints between the members.

The present invention provides a method of manufacturing and fabricating furniture having a plurality of cove joints between generally cylindrical wooden structural elements comprising the steps of forming coved ends in a first plurality of the elements; forming transverse bores in a second plurality of the elements; engaging elongated tensile means having screw threads at both ends thereof at one end thereof generally axially of and into the first elements at the coved ends thereof to extend therefrom to a predetermined extent; assembling the extending tensile means of the first elements into the bores of the second elements to bring the coved ends adjacent the curved cylindrical surfaces of the second element; assembling detachable matingly threaded means for engaging and setting the second elements onto the extending threaded ends of the extending tensile means to engage the second elements in opposing relation to the coved ends to compress the second elements against the coved ends in conforming relationship thereto to form the coved joints; and setting the engaging and setting means by further threadng thereof onto the tensile means to suitably compress the second elements against the coved ends to suitably stabilize the coved joints.

Preferably, the method of the present invention is applied to furniture having a plurality of coved joints in each piece of the furniture; each joint comprising first and second generally cylindrical wooden elements; the first element having a coved end for conformingly fitting endwise against the cylindrically curved surface of the second element at an angular relation thereto; the second element having located therein a transverse bore therethrough at the angular relation and the first element being generally axially aligned with the bore at the joint; and tensile means engaging the first and second elements and extending substantially through the bore in substantially undersized relation therewith for compressing the first and second elements together to stabilize the joints, the tensile means including elongated means for engaging the first element and for extending through the bore and detachable means for engaging the second element and the elongated means and setting the degree of the compressing the detachable means having a cylindrical portion slightly undersize of the bore for entry therein and a flange portion oversize of the bore for engaging the second element adjacent to the bore and covering the bore. The method includes the steps of forming the coved ends in a plurality of the first elements; forming the bores in a plurality of the second elements; engaging the elongated means in the plurality of the first elements generally axially thereof to extend from the coved ends to predetermined extents as a movement toward forming the plurality of the joints; assembling the elongated means extending from the first elements into the bores of the second elements for each of the plurality of the joints as a second movement toward forming the plurality of joints in each piece of the furniture, the detachable setting means being detached from the tensile means for the second movement; attaching the detachable setting means to the elongated means first for entry of the cylindrical portion in the bore to suitably center the outer end of the bore under the flange portion on the elongated means, and then to engage the second elements by the flange portions and compress the first and second elements together in the conformingly fitting relation as a third movement toward forming the plurality of joints; and setting the setting means for a suitable degree of compressing to suitably stabilize each joint as a final step in the fabrication of the furniture.

In the preferred method of manufacturing and fabricating furniture according to the present invention, the engagng and setting means have flange undersurfaces disposed in opposed relation to the coved ends and the flange undersurfaces have appearance skirts of annular or hollow generally cylindrical shape at the peripheries thereof extending toward the coved ends. This preferred method includes a step of setting the engaging and setting means to cause the skirts to cut into the second elements suitably for hiding the flange undersurfaces.

BRIEF DESCRIPTION OF THE DRAWINGS

FIG. 1 is a perspective view of a chair including fourteen cove joints embodying the present invention;

FIG. 2 is a perspective view of a table including alternative cove joints embodying the invention;

FIG. 3 is an elevational view of the cove joint between a front leg and an arm of the chair of FIG. 1;

FIG. 4 is a partially cut-away plan view of the cove joint of FIG. 3 taken along the line 4—4 thereof;

FIG. 5 is an elevational view of the alternative cove joints at the near leg of FIG. 2;

FIG. 6 is a plan view of the cove joints of FIG. 5;

DESCRIPTION OF THE PREFERRED EMBODIMENTS

Figure 7:
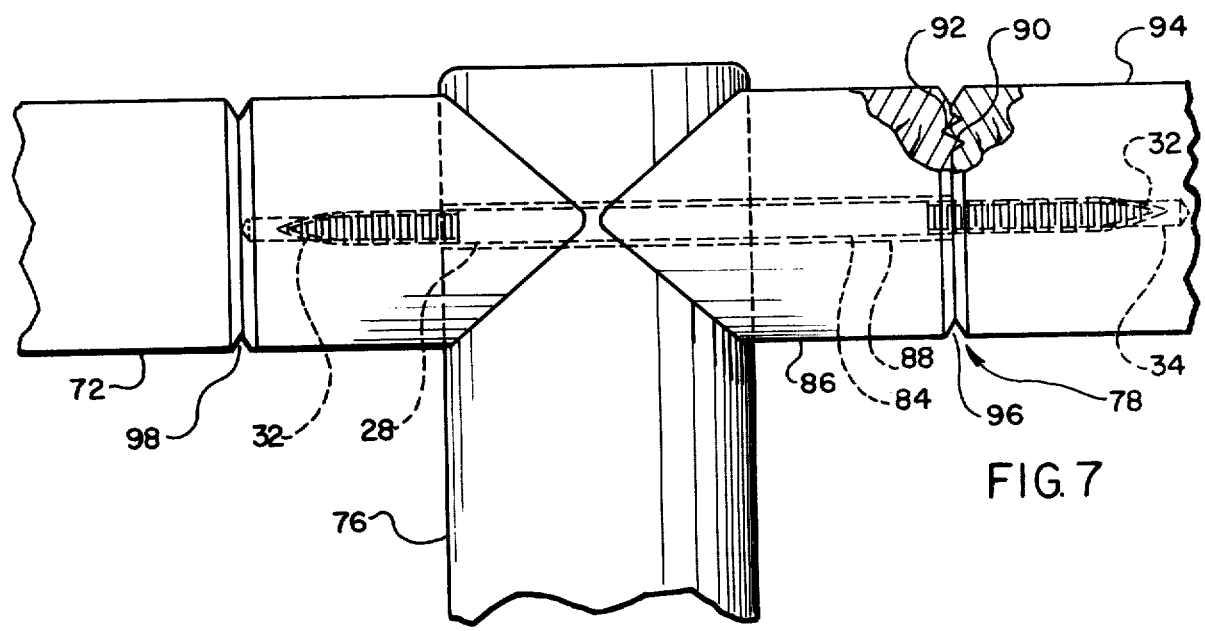
FIG. 7 is an elevational view of the alternative cove joints at the center leg of the right side of the table of FIG. 2.

The preferred embodiments of the present invention comprise cove joints for bearing the principal structural loads in furniture and are formed between generally cylindrical wooden structural members which are held compressed together at the joints by adjustable, releasable tensile means largely contained within the joints. The economy of manufacture of the wooden members used in these joints and the unusual strength, handsome appearance, and ease of assembly and disassembly of furniture constructed substantially entirely from such members and joints derive from the novel construction explained in detail hereinafter. The novel joints of the present invention may be used for constructing various pieces of furniture such as, but not limited to, chairs, tables, sofas, chaise longues, recliners, and case goods.

The generally cylindrical wooden structural members are most conveniently manufactured from relatively large wooden dowels furnished in kiln-dried precision-trimmed lengths up to about fifty inches by the Roundwood Corp. of America in Florence, S.C. These dowels are furnished in nominal 1¾, 2, 2¼, and 3 inch diametrical sizes under the trademark ROUNDWOOD ® and are known in the trade as ROUNDWOOD ® dowels. They are available in various species of wood, such as ash, gum, oak, soft and hard maple, cherry, and red alder, some from other manufacturers licensed to use the ROUNDWOOD ® dowel trademark.

A chair 20 constructed according to the present invention is disclosed in FIG. 1 and includes cove joints 22 according to the present invention wherever the principal structural elements of the chair 20 are joined. For example, a front leg 24, a generally cylindrical wooden member, is joined to an arm 26, another generally cylindrical wooden member, by the cove joint 22 as illustrated in FIG. 3, where the arm 26 is shown extending horizontally at the top, and the front leg 24 extends upwardly to a joint therewith, where the arm meets the leg at an angle thereto, in this embodiment generally perpendicularly. The illustrated front end of the arm 26 is formed to a concave, or coved, partial cylindrical shape 27 which mates or fits conformingly with the convexly curved, cylindrical or round back surface portion of the leg 24.

A bore or hole 28 is formed in the leg 24 to extend transversely therethrough at the same angle at which the arm meets the leg for reception of an elongated stud or hanger bolt 30 having wood screw threads 32 at one end which are driven into engagement with the coved end of the arm 26 lengthwise or axially thereof, thereby aligning the arm 26 generally coaxially with the bore 28 at the joint 22. The other end of the hanger bolt 30 is straight threaded externally and extends from the coved end of the arm 26 into and through the bore 28 in substantially undersized relation therewith to a predetermined extent to the vicinity of the front side of the leg 24. A flanged cap nut or T nut 40 (as best seen in FIG. 4) has a cylindrical portion 41 substantially larger in diameter than the stud 30, slightly undersize of the bore 28, and having in one end and axially thereof a blind hole 42 which is internally threaded and engages the straight threaded end 36 of the hanger bolt 30. At the other end of the cylindrical portion 41 the cap nut 40 has a hex driving socket 48 and an external flange 44 having at the periphery thereof an appearance skirt 46 of annular or hollow generally cylindrical shape extending toward the end of the cylindrical portion 41 containing the hole 42, and, when engaged with the bolt 30, toward the wood screw threads 32 thereof.

In operation or service, the cylindrical portion 41 of the nut 40 enters the bore 28 (which is slightly oversize with relation to the portion 41) prior to any contact of the appearance skirt 46 with the leg 24, thereby causing the assembler of the joint 22 to generally center the outer end of the bore 28 under the skirt 46 of the flange 44 so that the flange 44 covers the outer end of the bore 28, the flange 44 being suitably oversize of the bore 28 for engagement of the leg 24 adjacent the bore 28 all around when flange and bore are reasonably well centered. Centering of the inner end of the bore 28 on the hanger bolt 30 may be ignored, however, thereby accomodating any reasonable lack of accuracy in placement of bores 28, bolts 30, or coved shapes 27 in the wooden members 24 and 26. The hanger bolt 30 and the cap nut 40 serve as tensile means for compressing the arm 26 and the leg 24 together at their conforming fit at the joint 22 to stabilize the joint. The cap nut 40 by its threaded attached engagement with the hanger bolt 30 serves as a detachable means for suitably setting the degree of compression between the arm 26 and the leg 24 by creating tension in the hanger bolt 30 when screwed down on the bolt 30 and engaging the flange 44 with the front side of the arm 26 (in opposing relation to the conforming fit of the coved end of the arm against the leg) adjacent the outer end of the bore 28. A conventional hex bar wrench may be engaged with the socket 48 of the nut 40 to screw it down to the desired degree.

The appearance skirt 46, as best illustrated in FIG. 4, has a suitably sharp lip 50 at its extending lower edge which cuts into the front side of the leg 24 as the nut 40 is turned and screwed down until the under flat surface 52 of the flange 44 makes sufficiently heavy engagement with the wood of the leg 24 to create suitable compression between arm 26 and leg 24 for forming a suitably strong and stabilized joint 22. As may be best seen in FIGS. 3 and 5, the flange 44 is of sufficient thickness that, upon such suitable compression, at the periphery thereof the outer surface of the flange 44 opposite the undersurface 52 thereof remains slightly above flush with relation to the cylindrical surface of the leg 24 or 74 at its closest approach thereto, thereby covering the sharp edges of the wood cut by the appearance skirt 46. The appearance skirt 46 extends sufficiently below the under flat surface 52 of the flange 44 to be in contact with the curved front side of the leg 24 at all points on the circumference of the lip 50 of the skirt 46, thereby hiding the under surface 52 of the flange and avoiding the unsightly appearance and possibly dangerous catch point which an unskirted flange undersurface (typically not in complete surface-to-surface engagement with the curved front side of the leg 24) would present if the skirt 46 were omitted.

A specially headed lag screw or bolt (not shown) might be substituted for the combined hanger bolt 30 and cap nut 40 here disclosed, but it would not have the convenience for manufacture and use of the furniture as is explained hereinafter for the bolt 30 and nut 40. Other decorative or utilitarian head or flange designs (not shown) might be used on such lag screws or bolts, or cap nuts, and, of course, the bores 28 might be counterbored at the outside of the joint to allow use of standard bolts or nuts without protrusion beyond the wood, but it would then probably be necessary to cover the counterbore for appearance. A smooth- or barbed-shanked threaded stud might be driven into the pilot hole 34, and might be cross-pinned through the wood or otherwise treated for retention therein, leaving the straight threads exposed as on the hanger bolt 30, for use in the tensile means of the cove joint of this invention.

A seat 54 and a back 56 for the chair 20 as shown in FIG. 1 may be attached to front and rear seat rails 58 and 60 and a back rail 62 respectively by any conventional or convenient means and form no part of the present invention. The rails 58, 60, and 62 are joined to the front leg 24, a seat stretcher 64, a rear leg 66 respectively, and to their counterparts on the opposite side of the chair, at other cove joints 22 similar to that described in detail between front leg 24 and arm 26. All the rails, stretchers, and legs of the chair shown in FIG. 1 and mentioned above, as well as their counterparts on the other side of the chair, where applicable, are intended to be manufactured from ROUNDWOOD ® dowels and joined together by joints 22.

Where two members such as the rail 58 and the stretcher 64 join the leg 24 at generally the same level, the respective joints may be offset from each other lengthwise of the leg 24 or similar member so that the respective hanger bolts 30 in the bores 28 in the leg 24 do not interfere with each other. The variety of arrangements of ROUNDWOOD ® dowel legs, rails, and stretchers in chairs and other furniture pieces is unlimited, but cove joints similar to that shown in FIGS. 3 and 4 should be useful in most joints between such ROUNDWOOD ® dowel parts, and the chair 20 is generally representative of the furniture manufactured and fabricated according to the present invention.

Figure 8:
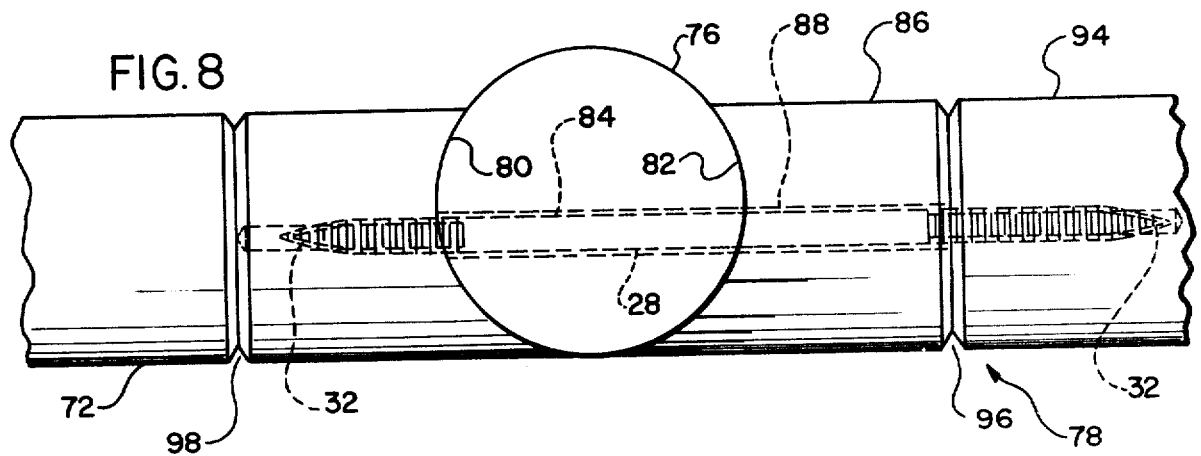
FIG. 8 is a plan view of the cove joints of FIG. 7.

Two alternative embodiments of cove joints according to the present invention are shown in FIG. 2, where a table 68 includes a horizontal stretcher 70 and a horizontal rail 72 mutually perpendicular and joining a vertical leg 74 at the same horizontal level. In this embodiment, the stretcher 70 and the rail 72 are smaller in diameter than the leg 74, about 80–85% as large, and the coves in the ends thereof are offset from the axes thereof toward the inside of the table by a distance about equal to the radius of the bores 28 in the leg 74, and the hanger bolts 30 in the cove ends are similarly offset toward the inside. The hanger bolt in the stretcher 70 is also offset upwardly from the axis thereof by a similar distance, while the hanger bolt in the rail 72 is offset downwardly from the axis thereof by a similar distance. Thus, the stretcher 70 and rail 72 as shown in more detail in FIGS. 5 and 6 do not interfere with each other where closest at the inside of the table 68, nor do their hanger bolts 30 interfere where they cross inside the leg 74. A suitable table top 75 may then be placed for support by the stretcher 70 and the rail 72 and their similar counterparts around the table, the top having been notched suitably to accommodate the table legs, such as the leg 74.

Where a center leg such as that indicated by the numeral 76 in FIG. 2 is desirable for support, appearance, or because the usual maximum length of about 48–50 inches for ROUNDWOOD ® dowels is insufficient for the desired length of rail in a piece of furniture such as the table 68, the rail 72 may be joined to the leg 76, and another composite rail 78 may be joined to the leg 76 opposite the rail 72 and in extension thereof. Both rails and the leg are generally cylindrical wooden members, and details of their structure and joining are shown in FIGS. 7 and 8, in general the two rails forming two cove joints as described hereinbefore with the leg 76, and the previous description may be read appropriately into this embodiment except for the hanger bolt and cap nut. For appearance, the leg 76 in this embodiment is the same diametrical size as the leg 74; and the rails 72 and 78 are located somewhat outwardly from the axis of the leg 76, in the same relation as that of the rail 72 to the leg 74, by offsetting the respective coves 80 and 82 in the ends of the rails 72 and 78 from their axes similarly to that of the rail 72 where it joins the leg 74. However, a special stud or hanger bolt 84 having wood screw threads 32 at both ends thereof is engaged at one end thereof in the end of the rail 72 adjoining the leg 76 axially of the rail 72. The bore 28 extends transversely through the leg 76, and is offset from the axis of the leg outwardly of the table 68 by a distance equal to the radius of the bore. The composite rail 78 includes a generally cylindrical wooden adjoining portion 86 having a bore 88 for the bolt 84 passing axially therethrough and including the aforementioned cove 82 at one end thereof. The other end of the portion 86 is configured to have at least one annular V-groove 90 formed therein to mate in engagement with at least one corresponding annular V-tongue 92 formed in one end of a generally cylindrical wooden extension portion 94 of the composite rail 78. The annularly-tongued end of the extension portion 94 has a pilot hole 34 formed axially therein to receive the wood screw threads at the other end of the special hanger bolt or stud 84 when the rails 72 and 78 are joined to the leg 76.

Obviously, by rotation of the extension portion 94 relative to the rail 72, stud 84, and adjoining portion 86, stud 84 serves as a tensile means between rail 72 and extension portion 94, and extension portion 94 and the mating screw threads 32 serve as setting means for adjusting the degree of compressing the rail 72, the leg 76, the adjoining portion 86, and extension portion 94 all together to stabilize the cove joints between the rails 72 and 78 and the leg 76 and the V-tongue and -groove engagement within the rail 78. The annular V-tongue 92 and V-groove 90, as mated together, form an annular finger joint configuration between adjoining portion 86 and extension portion 94 which permits rotatable annularly mating engagement therebetween while maintaining alignment therebetween. For appearance, the peripheral edges of portions 86 and 94 at the annular joint may be chamfered to simulate a V-groove at the joint as indicated by the numeral 96, and the rail 72 may have a corresponding V-groove 98 formed therein.

Figure 9:
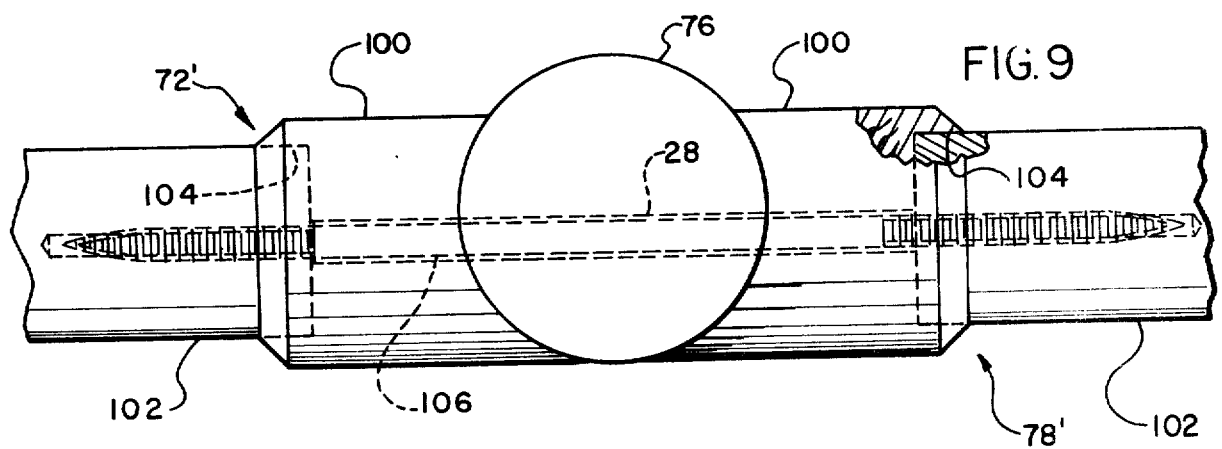
FIG. 9 is a plan view similar to FIG. 8 showing another alternative cove joint and rail construction.

Both rails 72 and 78 may be formed compositely as alternatively indicated by the numerals 72' and 78' in FIG. 9, where the adjoining portions 100 are of larger diametrical size than the extension portions 102 to save material, and the adjoining portions 100 have counterbores 104 to receive the plain cylindrical ends of the extension portions 102 for alignment and rotation. A longer special hanger bolt 106 is obviously required for this embodiment.

Furniture constructed essentially from large dowels and cove joints according to the present invention presents a handsome contemporary appearance, which in various woods, component sizes, and finishes is attractive for all market sectors from the lawn and swimming pool to the elegant modern living room, the office, and for motels (when the cap nuts are equipped with special one-way driving sockets for discouraging theft).

The standardized nature of the cylindrical wooden structural elements makes them readily adaptable, as hereinbefore described, for complete automated manufacture and finishing, including installation of hanger bolts in one or both ends, in economical manufacturing lot sizes. These elements may then be stored, in whatever variety and quantity may be desirable to support a broad range of styles and furniture pieces, in a minimum of space, for later selection for factory assembly, or for shipment of knock-down kits containing all structural and other elements for assembly by a furniture store, institutional customer, or retail customer into joints and furniture according to the present invention. This final assembly and fabrication need only involve selecting suitable structural elements for the particular piece of furniture to be fabricated, assembling the extending hanger bolts thereof into the appropriate transverse bores thereof, threadably assembling or attaching the cap nuts to the hanger bolts and screwing the nuts down on the bolts to set suitable degrees of compression between the structural elements to stabilize each joint and complete the fabrication of the furniture piece so far as the major structural elements are concerned—further assembly of seats, backs, cushions or other upholstery, table tops, decorative matter, or other items may be done thereafter or in conjunction therewith without affecting the method of the present invention.

The small amount of machinery and equipment required to automatically manufacture the structural components from precision-trimmed-to-length ROUNDWOOD ® dowels, and the knock-down storage features make this furniture attractive to the manufacturer, while sturdiness, handsome contemporary styling, and simple assembly appeal to the retail dealer and customer alike.

While the general proportions and principles of the cove joints of this invention are illustrated in the accompanying drawings, it is obvious that the exact dimensions may vary to accommodate selected sizes of the dowels comprising the structural furniture elements, and the hanger bolts, cap nuts, bores, etc. may also be varied in size and detail without departing from the scope of this invention, which is to be determined by the scope of the claims appended hereto.

We claim:

1. In a furniture joint having a first generally cylindrical wooden member, a second generally cylindrical wooden member coved at an end thereof to fit conformingly against the cylindrically curved surface of said first member at an angle to said first member, tensile means for engaging with and extending between said first and second members and at least substantially through said first member for compressing said members together where conformingly fit against each other, and a transverse bore extending through said first member for reception therein of said tensile means for engaging with said first member adjacent said bore, said tensile means including an external flange having an undersurface thereof for said engaging with said first member at the cylindrical surface thereof opposite from said conforming fit of said second member against said first member and means connected to said flange for setting the degree of said compressing by sufficiently heavy said engaging of said undersurface with the wood of said opposite cylindrical surface to create sufficient said compressing for stabilizing said joint, the improvement wherein said engaging flange of said tensile means has at the periphery thereof an appearance skirt of annular or hollow generally cylindrical shape having a lip extending below said undersurface toward said second member for cutting into said opposite cylindrical surface of said first member during said setting for essentially complete circumferential contact of said skirt with said opposite cylindrical surface upon said stabilizing for hiding said undersurface.

2. In a furniture joint according to claim 1 and characterized further in that said tensile means at one end thereof engages with said second member and at the other end thereof has said external flange, the further improvement wherein said tensile means has a portion thereof larger than the portion thereof adjacent said end thereof engaging said second member for entry into said transverse bore adjacent the outer end thereof for disposing said skirt in covering relation over said bore prior to circumferential contact of said skirt with said first member.

3. A method of manufacturing and fabricating furniture having a plurality of cove joints in each piece of said furniture; each said joint comprising first and second generally cylindrical wooden elements; said first element having a coved end for conformingly fitting endwise against the cylindrically curved surface of said second element at an angular relation thereto; said second element having located therein a transverse bore therethrough at said angular relation and said first element being generally axially aligned with said bore at said joint; and tensile means for engaging said first and second elements and extending through said bore in substantially undersized relation therewith adjacent the inner end of said bore for compressing said first and second elements together to form and stabilize said joint, said tensile means including means for setting the degree of said compressing, said tensile means having an enlarged portion for disposition within the outer end of said bore and a flanged portion oversize of said bore comprising said means for engaging said second element; said method including the steps of:

(a) forming said coved ends in a plurality of said first elements;

(b) forming said bores in a plurality of said second elements;

(c) engaging said tensile means in said plurality of said first elements generally axially thereof to extend from said coved ends as a movement toward forming said plurality of said joints;

(d) assembling said tensile means to extend from said first elements into said bores of said second elements and disposing said enlarged portions of said tensile means in the outer ends of said bores for each of said plurality of said joints as further movement toward forming said plurality of said joints in said each piece of said furniture;

(e) at each said joint engaging said flanged portion with said second element and compressing said first and second elements together in said conformingly fitting relation as a final movement toward forming said plurality of said joints, said disposition of said enlarged portion in said bore causing said flanged portion to be disposed in covering relation over said bore prior to said engaging said second element; and (f) setting said setting means for a suitable degree of said compressing to suitably stabilize each said joint as a final step in said fabrication of said furniture.

4. A method of manufacturing and fabricating furniture having a plurality of cove joints between generally cylindrical wooden structural elements comprising the steps of:

(a) forming coved ends in a first plurality of said elements;

(b) forming transverse bores in a second plurality of said elements;

(c) engaging tensile means having elongated portions thereof at one end of said elongated portions generally axially of and into said first elements at said coved ends thereof to extend therefrom to a predetermined extent, the extending ends of said elongated portions having screw threads, said tensile means having detachable means threaded for matingly engaging said threads and flanged portions for engaging and setting said second elements, and said elongated portions having portions substantially undersized of said bores adjacent said coved ends;

(d) assembling said elongated portions extending from said first elements into said bores of said second elements to bring said coved ends adjacent the curved cylindrical surfaces of said second elements;

(e) assembling said detachable means by threading engagement with said extending ends for flangedly engaging said second elements adjacent the outer ends of said bores and setting said second elements against said first elements in opposing relation to said coved ends to compress said second elements against said coved ends in conforming relationship thereto to form said cove joints, said tensile means having portions thereof larger than said undersized portions for entry into said bores adjacent the outer ends thereof for disposing the flanged portions of said detachable means in covering relation over said bores prior to said flangedly engaging said second elements; and (f) setting said detachable engaging and setting means by further threading thereof with said elongated portions to suitably compress said second elements against said coved ends to suitably stabilize said cove joints.

5. A method of manufacturing and fabricating furniture according to claim 3 or 4 wherein said flanged portions of said tensile means have flange undersurfaces disposed in opposed relation to said coved ends and said flange undersurfaces have appearance skirts of annular or hollow generally cylindrical shape at the peripheries thereof extending below said undersurfaces toward said coved ends and characterized further in that said step of setting said setting means causes said skirts to cut into said second elements suitably for hiding said flange undersurfaces.

6. In a furniture joint according to claim 1 the further improvement wherein said flange is of sufficient thickness that at the periphery thereof the outer surface of said flange opposite said undersurface thereof remains above flush with relation to said opposite cylindrical surface of said first member upon said sufficiently heavy engaging of said undersurface with said opposite cylindrical surface for stabilizing said joint.

7. In a furniture joint according to claim 6 the further improvement wherein said outer surface lies only slightly above flush at its closest approaches to said opposite cylindrical surface of said first member upon said sufficiently heavy engagement.

8. In a furniture joint according to claim 2 the further improvement wherein said flange is of sufficient thickness that at the periphery thereof the outer surface of said flange opposite said undersurface thereof above flush with relation to said opposite cylindrical surface of said first member upon said sufficiently heavy engaging of said undersurface with said opposite cylindrical surface for stabilizing said joint.

9. In a furniture joint according to claim 8 the further improvement wherein said outer surface lies only slightly above flush at its closest approaches to said opposite cylindrical surface of said first member upon said sufficiently heavy engagement.

10. In a furniture joint having a first generally cylindrical wooden member, a second generally cylindrical wooden member coved at an end thereof to fit conformingly against the cylindrically curved surface of said first member at an angle to said first member, tensile means for engaging with and extending between said first and second members and at least substantially through said first member for compressing said members together where conformingly fit against each other, and a transverse bore extending through said first member for reception therein of said tensile means for said engaging with said first member adjacent said bore, said tensile means at one end thereof engaging with said second member and having at the other end thereof an external flange for said engaging with said first member, the improvement comprising an enlarged portion of said tensile means, said enlarged portion being larger than the portion of said tensile means adjacent said end thereof engaging said second member for entry into said transverse bore adjacent the outer end thereof for disposing said flange in covering relation over said bore prior to said engaging of said flange with said first member.

11. Furniture having structural members and load-bearing joints therebetween, substantially all of said structural members being wood of elongated generally cylindrical shape and substantially all of said load-bearing joints between said members being joints having improvements according to claim 1, 2, 6, 8 or 10.

12. A furniture joint according to claim 1 or 2 and characterized further in that said setting means is threaded and includes driving means for turning thereof for said setting the degree of said compressing.

13. A furniture joint according to claim 10 and characterized further in that said tensile means has threaded means for said compressing said members together and means for driving said threaded means connected thereto.

14. Furniture having structural members and load-bearing joints therebetween, substantially all of said structural members being wood of elongated generally cylindrical shape and substantially all of said load-bearing joints between said members being joints having improvements according to claim 12.

15. Furniture having structural members and load-bearing joints therebetween, substantially all of said structural members being wood of elongated generally cylindrical shape and substantially all of said load-bearing joints between said members being joints having improvements according to claim 13.

* * * * *